United States Patent [19]

Tokuda

[11] Patent Number: 5,432,579
[45] Date of Patent: Jul. 11, 1995

[54] PHOTOGRAPH PRINTING SYSTEM

[75] Inventor: Kanji Tokuda, Kanagawa, Japan

[73] Assignee: Fuji Photo Film Co., Ltd., Kanagawa, Japan

[21] Appl. No.: 179,823

[22] Filed: Jan. 11, 1994

Related U.S. Application Data

[63] Continuation of Ser. No. 956,241, Oct. 5, 1992.

[30] Foreign Application Priority Data

Oct. 3, 1991 [JP] Japan ................................. 3-283585

[51] Int. Cl.$^6$ ..................... G03D 13/00; G03D 13/02; G03D 27/52
[52] U.S. Cl. .............................. 354/293; 354/334; 355/27; 355/77
[58] Field of Search .............. 354/298, 299, 324, 334; 355/38, 77, 27, 68, 100; 358/487

[56] References Cited

U.S. PATENT DOCUMENTS

| | | | |
|---|---|---|---|
| 3,785,268 | 1/1974 | Gregg et al. | 354/298 |
| 4,134,663 | 1/1979 | Laar et al. | 354/298 |
| 4,332,456 | 6/1982 | Kaufmann | 354/298 |
| 4,881,095 | 11/1989 | Shidara | 354/298 |
| 5,019,857 | 5/1991 | Milovanovich | 355/27 |
| 5,083,152 | 1/1992 | Tokuda | 355/27 |
| 5,101,286 | 3/1992 | Patton | 358/487 |

Primary Examiner—D. Rutledge
Attorney, Agent, or Firm—Sughrue, Mion, Zinn, Macpeak & Seas

[57] ABSTRACT

A printer/processor has at least two rinsing or washing vessels interconnected by a rectangular tube passage through which a negative film passes. Two transparent plates form the upper and lower walls of the passage, a light source unit being mounted above the passage and an image pickup unit being mounted under the passage. The image pickup unit scan an image on a negative film immersed in the rinsing solution while it passes through the passage. Image data outputted from the image pickup unit is immediately sent to an image processing unit of a printer/processor. The image processing unit processes the image data so that an original frame of the negative film can be properly printed on a color paper. A printer unit of the printer/processor prints a color image reproduced from the image data onto the color paper. The printer/processor develops the printed color paper to make photoprints.

11 Claims, 8 Drawing Sheets

PHOTOGRAPH PRINTING SYSTEM

This is a continuation of application No. 07/956,241 filed Oct. 5, 1992.

BACKGROUND OF THE INVENTION

1. Field of the Invention

The present invention relates to a photograph printing system, and more particularly to a photograph printing system capable of quickly making a hard copy such as a photoprint, by utilizing a film processor with an image pickup unit which scans the image on the film and converts it into an electrical signal.

2. Description of the Related Art

In a photo laboratory, a photographic film, e.g. negative film, is developed by a film processor. The developed negative film is placed in a printer or a printer/processor, wherein the images of original frames recorded on the negative film are projected onto a color paper to make photoprints.

Such a photograph printing system is disadvantageous in that a negative film cannot be placed in to a printer or printer/processor until it has been developed by the film processor. As shown in FIG. 7, making photoprints with a conventional photograph printing system includes a film development process, a film setting process, a print process, a paper development process, and a cutting process. It takes about 20 minutes to develop a customer deposited exposed negative film and obtain final photoprints. If the customer wishes to leave with the photoprints, he is forced to wait at least 20 minutes. Furthermore, it is necessary to manually place a developed negative film in a printer or printer/processor and damage of the film may occur during such manual handling.

As shown in FIG. 8, it is known that a film processor and printer/processor may be coupled together to feed a negative film developed by the film processor directly to the printer/processor, thereby lessening the processing time. In this case, however, it is necessary to provide a film guide mechanism and the like for automatically feeding a developed negative film from the film processor to the film carrier of the printer/processor. Such a guide mechanism serves to complicate the system structure.

SUMMARY OF THE INVENTION

It is a principal object of the present invention to provide a photograph printing system capable of lessening the time required for obtaining photoprints from a customer deposited exposed negative film.

It is another object of the present invention to provide a photograph printing system which is not likely to damage the negative film.

The above and other objects are achieved by a combination of a film processor with an image pickup unit, an image processing unit, and a printer for recording an image by using electric signals. The image pickup unit scans a negative film and obtains image data during the period between a negative film development process and drying process. The image processing unit processes image data outputted from the image pickup unit. The processing by the image processing unit includes a correction calculation for the particular film type and original frames, and a gradation correction for the printer characteristics and customer preference. The printer prints an image reproduced from image data outputted from the image processing unit, on a recording material.

According to a preferred embodiment of the present invention, the printer is loaded with a roll of color paper as a recording material, and prints a reproduced optical image on the color paper. The printer has a paper processor unit so as, to constitute a printer/processor. Preferably, the image processing unit is assembled with the printer or printer/processor.

According to another preferred embodiment of the present invention, the image pickup unit reads image data of a negative film while the negative film moves through a rinsing solution or washing water. The printer/processor has first and second exposure systems, the first exposure system uses a negative film for the printing exposure, and the second exposure system uses image data relating to the frame to be printed. The printer/processor of this type can be applied to a printing process for developed negative films and to a DP (development and printing) process for customer deposited exposed (undeveloped) negative films.

According to the present invention, after the development process of a negative film, an image of a frame is converted to an electric signal. An image reproduced from the electric signal is recorded on a recording material. Accordingly, image recording can be performed in parallel with the washing, rinsing or drying processes and the like, thereby reducing the time required for making hard copies. Accordingly, an urgent DP process ordered by a customer can be dealt with in a short time, reducing customer waiting time.

The density of color dyes of negative film changes reversibly with temperature. With a conventional printer, it is necessary to cool a negative film under exposure in order to eliminate the change in the density thereof caused by the heat from an exposure lamp. In the present invention, the negative film is immersed in processing solution of a constant temperature. Therefore, the density of color dyes is constant and will not change during an image pickup process, thus providing stable image data.

According to the present invention, it is not necessary to place a developed negative film in a printer/processor, as opposed to the conventional case. Accordingly, negative films will not tend to become dirty or scratched because contact with the operator's hands or mechanical apparatuses is reduced. Furthermore, it is possible to start the image data processing immediately after reading image data of a roll of a negative film. In this case, image data correction can easily be made in accordance with the type of the negative film and the photographic characteristics of the subjects photographed.

BRIEF DESCRIPTION OF THE DRAWINGS

The above objects and advantages of the present invention will become more apparent upon reading the detailed description of the embodiments in connection with the accompanying drawings.

DETAILED DESCRIPTION OF THE PREFERRED EMBODIMENTS

Figure 1:
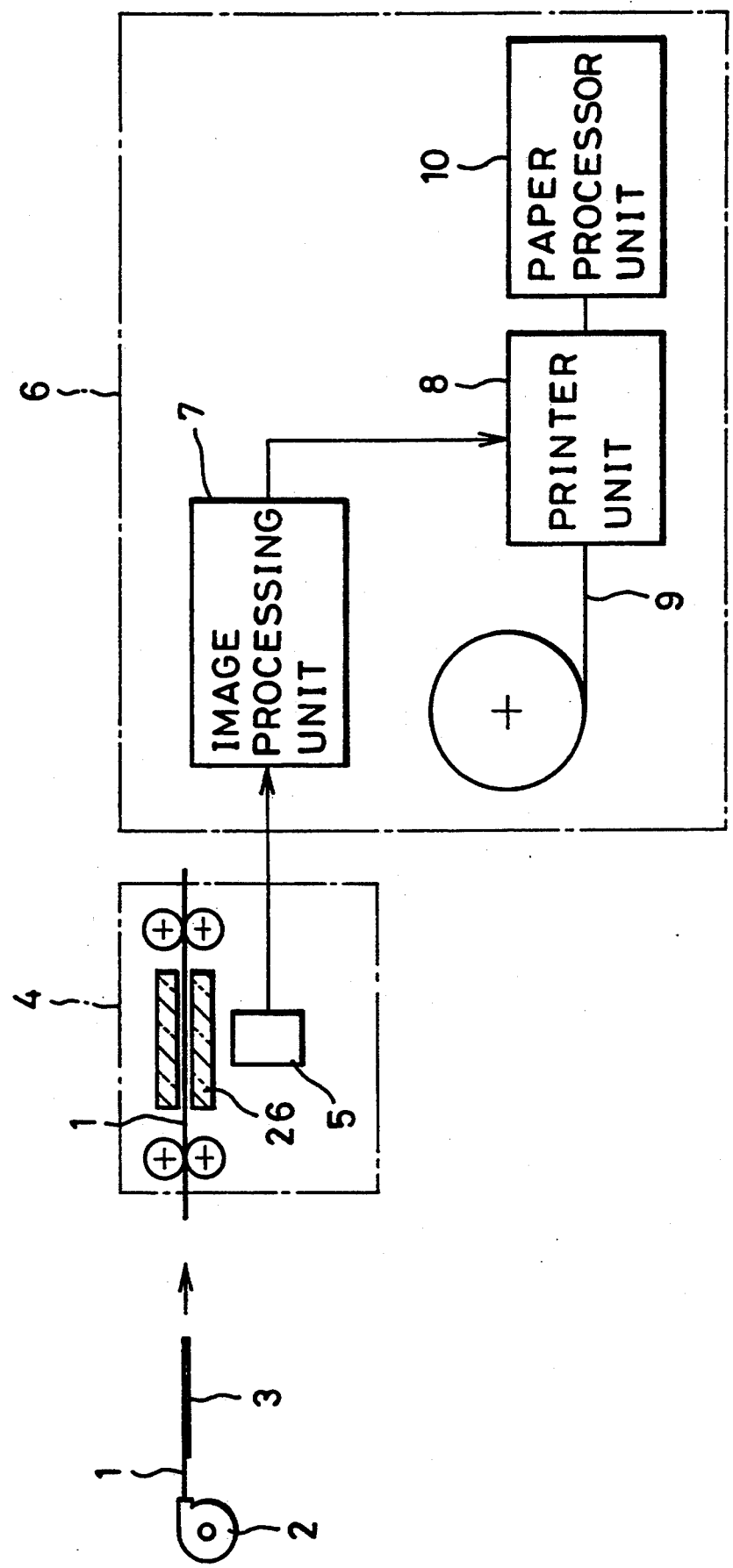
FIG. 1 is a schematic diagram showing an embodiment of a photograph printing system according to the present invention.

FIG. 1 is a schematic diagram illustrating a first embodiment of a photograph printing system according to the present invention which utilizes a printer/processor having an integrally assembled printer unit and paper processor unit. An exposed color negative film 1 is wound up and accommodated within a cassette 2 in the manner well known in the art. In developing the negative film, first the leader of the negative film 1 is pulled out of the cassette 2 by using a known leader catching jig, and the leader is joined with a leader sheet 3. The leader sheet 3 has perforations formed at the center thereof at an equal pitch. These perforations engage with an endless belt or sprocket having a number of protrusions also formed at the same pitch. Through this engagement, the film 1 is transported while being immersed in processing vessels or baths of a film processor 4.

In the film processor 4, the negative film 1 is transported and immersed in processing vessels for a photographic process. During a washing or rinsing process in the photographic process, images recorded on the negative film 1 are read by an image pickup unit 5 through a transparent guide 26 within which rinsing solution or washing water flows. The image pickup unit 5 may be a color television camera having a color image area sensor, a color image line sensor reading images synchronously with the feeding of the film, or any other appropriate device. The read image data is sent to an image processing unit 7 of a printer/processor 6. The image processing unit 7 executes necessary correction of the image data, and sends the corrected image data to a printer unit 8. The printer unit 8 exposes a color paper 9 according to the corrected image data. The exposed color paper 9 is then developed by a paper processor unit 10.

Figure 2:
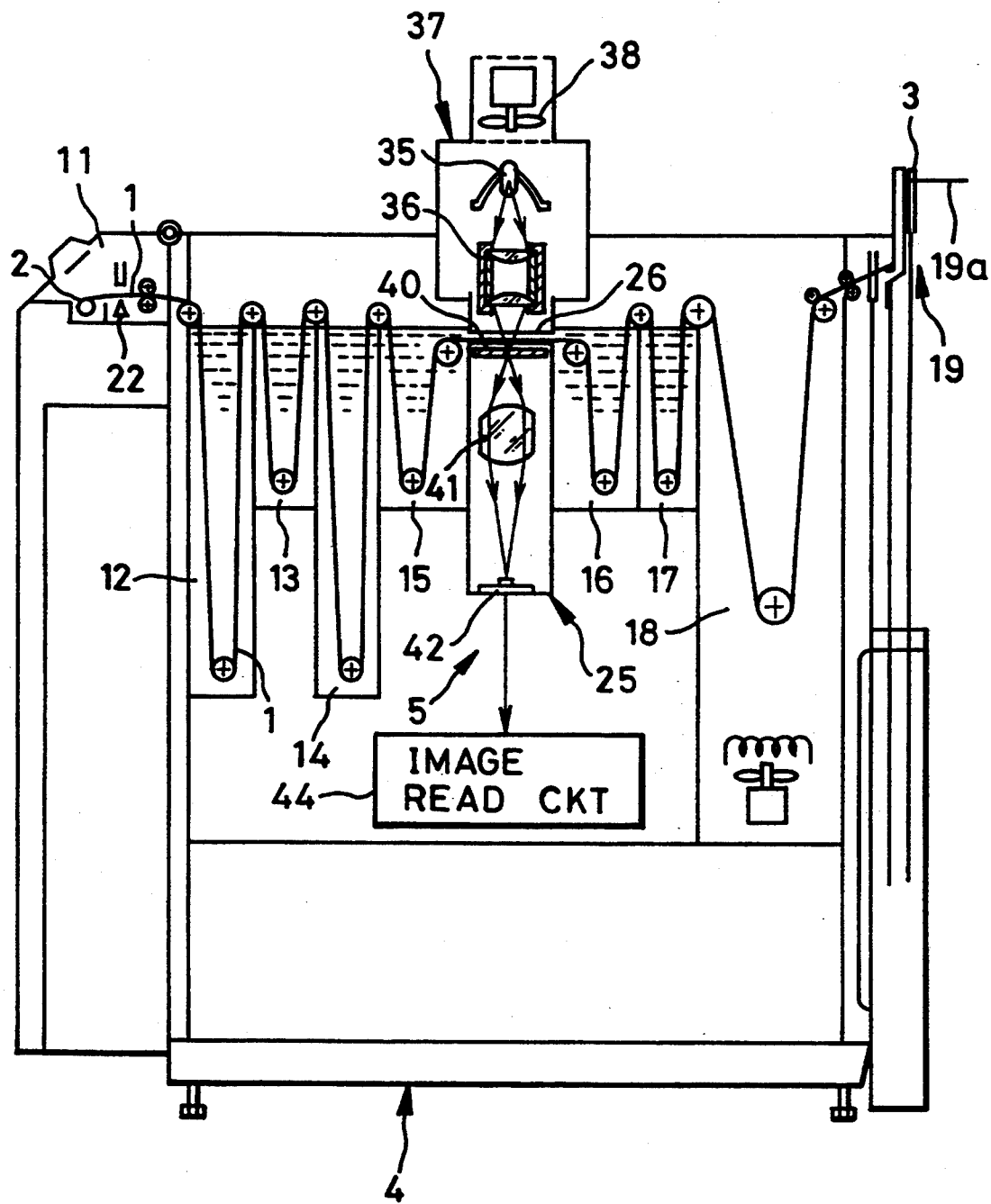
FIG. 2 is a schematic diagram showing an embodiment of a film processor.

As shown in FIG. 2, the film processor 4 has a film setting unit 11, various processing vessels 12 to 17, a drying unit 18, and a film stacker unit 19. The film setting unit 11 is loaded with the cassette 2 having the leader of the negative film 1 joined to the leader sheet 3. As the leader sheet 3 advances, the negative film 1 is pulled out of the cassette 2 and guided through the various processing vessels 12 to 17 in order. When the negative film 1 is completely pulled out of the cassette 2, the film end is cut by a cutter 22 to separate the negative film 1 from the cassette 2. As well known, the processing vessels 12 to 17 include a color development vessel 12, a bleach vessel 13, a bleach-fix vessel 14, super rinsing vessels 15 and 16, and a stabilizing vessel 17. The negative film 1, after being processed in the processing vessels 12 to 17, is dried with hot air at the drying unit 18. The leader sheet 3 of the negative film 1 exiting from the drying unit 18 is held by a hook of the film stacker unit 19. The dried negative film 1 is thereby suspended within the film stacker unit 19. Also, it is possible to utilize a leader-advancing cassette in which rotation of a spool can cause the film leader completely within the cassette to advance to the outside.

Figure 3:
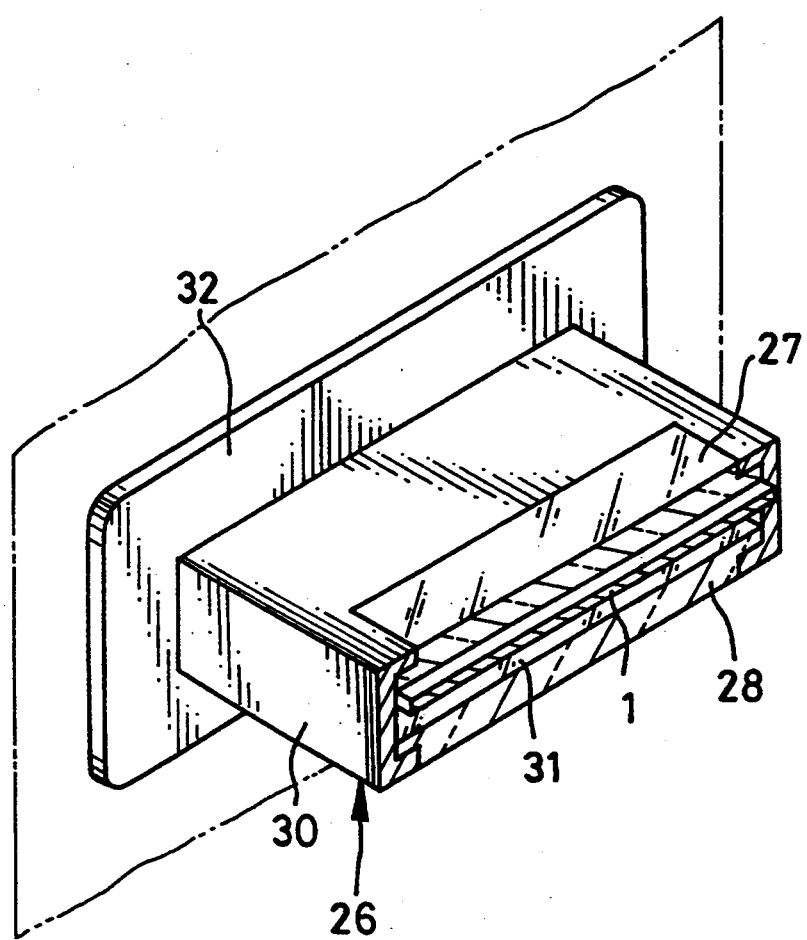
FIG. 3 is a perspective view of the transparent guide shown in FIG. 2.

The super rinsing vessels 15 and 16 are mounted separately in the film advance direction within the film processor 4, the image pickup device 5 being interposed therebetween. The transparent guide 26 for guiding a negative film 1 is mounted so as to interconnect the two super rinsing vessels 15 and 16. Solution in the super rinsing vessels 15 and 16 is made to flow from the upstream rinsing vessel 15 to the downstream rinsing vessel 16 as viewed in the film advance direction, in order to reduce the amount of waste solution. The transparent guide 26 allows the passage of solution from the vessel 15 to the vessel 16. As shown in FIG. 3, the transparent guide 26 is constructed of two reinforced glass plates 27 and 28 fixedly mounted in opposition to each other by a holding member 30. A passage 31 for the negative film 1 is formed between the two glass plates 27 and 28. The passage 31 is of a water-tight structure so as not carry the solution flowing from the vessel 15 to the vessel 16. Flanges 32 are mounted on opposite ends of the transparent guide 26, and joined to the negative film outlet and inlet formed in the super rinsing vessels 15 and 16, respectively, by means of packing members (not shown).

A light source unit 37 made of a lamp 35 and condenser lens system 36 is mounted above the transparent guide 26. A cooling fan 38 is provided so as to circulate air around the lamp 35. Mounted under the transparent guide 26 are a slit plate 40, a lens 41, and a CCD line sensor 42. A narrow slit is formed in the slit plate 40 in the widthwise direction of the negative film 1. An image on the negative film 1 illuminated by the light source unit 37 is focussed on the surface of the color line sensor 42 by means of the slit plate 40 and lens 41.

The color line sensor 42 is constructed of three CCD lines and R, G, and B color filters mounted on each CCD line. The dynamic range of a usual CCD line sensor is about $D=2$ as expressed by the density value, which is smaller than the maximum density $D=3.5$ of an image on a negative film. Therefore, an image on a negative film cannot always be read correctly with such a CCD line sensor. However, the tone of color dyes of a negative film immersed in solution is small as compared with that of a negative film after it was dried. Accordingly, the dynamic range of an image on a negative film immersed in solution is small, allowing it to be read it correctly. Accordingly, is not necessary to provide various complicated means for compensating for the small dynamic range of a CCD line sensor.

An image read circuit 44 receives electric signals from the color line sensor 42 as three color image data, synchronously with the film advance, and sends the signals to the image processing unit 7. In place of the color line sensor, a color image area sensor may also be used. Since an image on the negative film 1 is read via the transparent guide 26 while the film is immersed in selection, any scratches on the negative film 1 will not appear on a photoprint. Reading the image while the film is immersed in the solution, which renders scratches not conspicuous on a resulting photoprint, is particularly useful because the use of a compact scanning apparatus of the color line sensor 42 of this embodiment necessarily requires a convergent light source.

Figure 4:
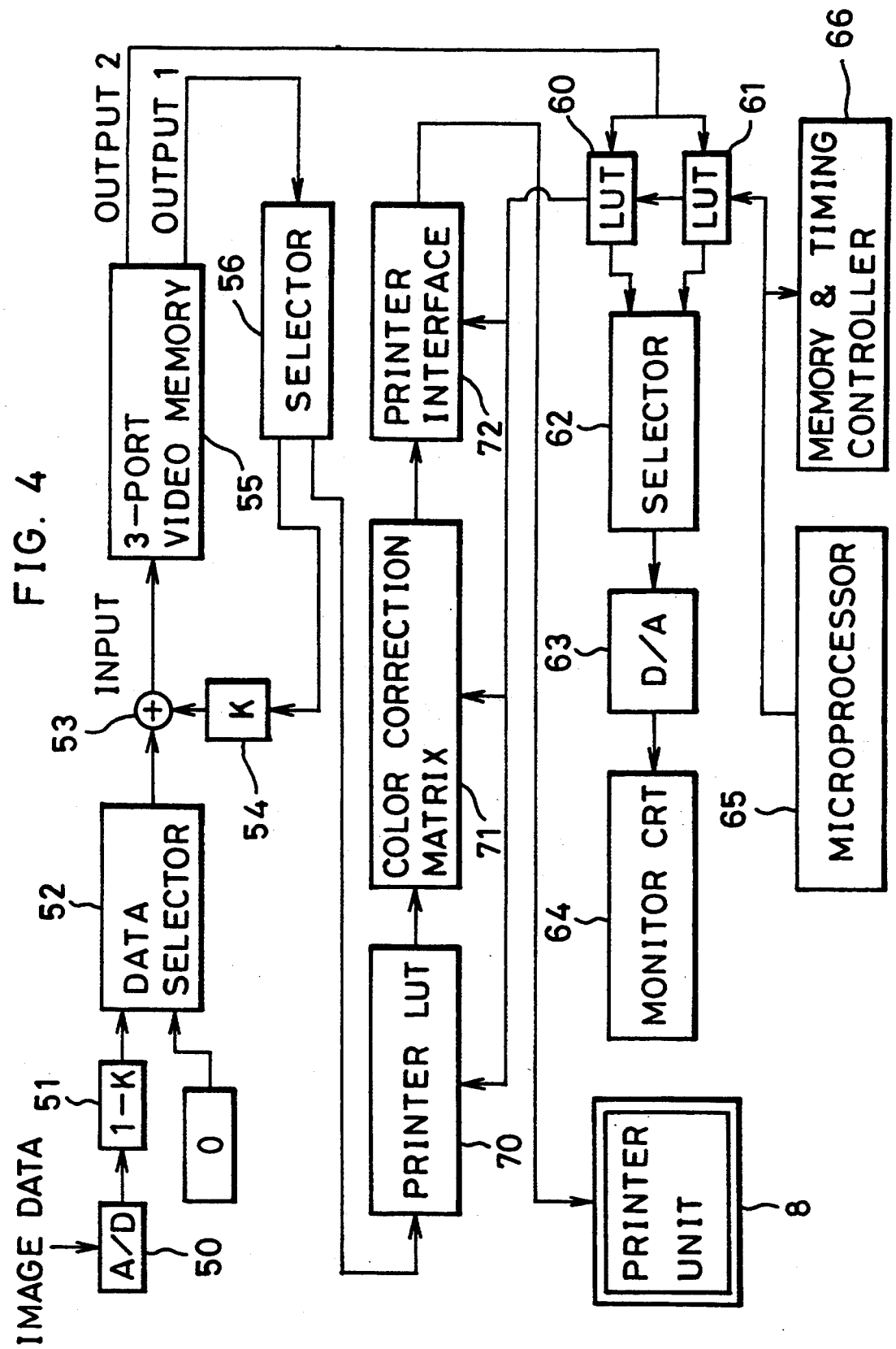
FIG. 4 is a block diagram showing a first embodiment of an image processing unit.

FIG. 4 is a block diagram showing the image processing unit 7 having a gradation correction function. Three color image data, in the form of analog electric signals, from the color line sensor 42 is digitized by an A/D converter 50, and inputted to a multiplier 51. The multiplier 51 multiplies the input three color image data by a coefficient (1−K) so as to suppress noise. This image data is then inputted via a selector 52 to an adder 53 to be added to the data from a multiplier 54, the result being supplied to a three-port video memory 55. This video memory 55 outputs two types of image data each having a different transfer speed, so that the image data can be outputted at the same time at peripheral terminal apparatuses having different transfer speeds (e.g., a CRT display and a photographic printer, which have a large transfer speed difference therebetween). The image data having a slower transfer speed is called an output 1, and that having a faster transfer speed is called an output 2. The output 1 is provided with two transfer speeds, one being the same as that of an input from the image pickup unit and the other suitable for use with the printer. The output 2 is provided with a transfer speed suitable for a CRT display.

The image data output 1 is supplied to the multiplier 54, multiplied by a coefficient K for noise elimination, and inputted to the adder 53. The image data output 1 inputted to the multiplier 54 at any given time is the image data corresponding to one frame before the image data from the data selector 52 at the same time. In this manner, noise components of the image data are eliminated. The coefficient K of the multiplier 54 may be set to '11" and the input data at a desired area may be set to 110" at the data selector 52. In this case, the selector 56 operates to select the output 1 only for the above-described desired area. If the transfer speed of the output 1 is doubled and the image data output 1 is thinned every second pixel and inputted to the adder 53, the image one frame before is reduced to a half size and superposed within the current frame image at the above-described desired area (called a picture-in-picture). If the image data is not thinned and the write area is controlled, it is possible to display the same image side by side in one frame.

The image data output 2 is subjected to gamma correction and the like at look-up table memories 60 and 61 (hereinafter called LUT). The corrected image data is then supplied via a selector 62 to a D/A converter 63, converted into an analog signal, and supplied to a monitor CRT 64. LUTs 60 and 61 are used independently for the color tone correction of the current frame image and inserted image during the picture-in-picture mode, to display them on the monitor CRT 64. In this manner, the image before color correction (image reduced in size) and the image after color correction can be compared in real time for the color tone correction.

LUTs 60 and 61 are made of high speed memories, and written with predetermined data at each address in advance under the control of a microprocessor 65, to allow color tone conversion. In addition to the renewal of data in LUTS, the microprocessor 65 controls the renewal of coefficients of a color correction matrix and multi-pliers. Reference numeral 66 represents a memory and timing controller.

In transferring the frozen image data to the printer, the image data is read from the video memory 55 as the image data output 1. The image data output is subjected to tone conversion by a printer LUT 70. A correction data stored in this LUT 70 is renewed by input data from a keyboard to convert the image tone. The tone converted image data is then corrected by a color correction matrix circuit 71 so as to match the color characteristics of a color paper or the like. The corrected image data is then supplied via a printer interface 72 to the printer unit 8. The image of the negative film is picked up while the film is immersed in the passage 31 between the super rinsing vessels 15 and 16. In this context, the color correction matrix circuit 71 performs the color correction while considering not only the color characteristics of a color paper, but also a difference in the tone and spectral characteristics of color dyes of the negative film 1 between the washing process and drying process.

An optical type color printer may be used as the printer unit 8. In such a device, three images, each corresponding to a primary color, are sequentially displayed on a monochrome CRT, and the three images are printed on a color paper thorough a three color sequential exposure, with three color filters properly inserted into a print optical path respectively during each exposure. Instead of an optical color printer, a color thermal printer, color ink jet printer, or the like may be used. Also, an optical type printer may use a CRT as well as a liquid crystal panel or a laser beam at the recording stylus.

Figure 5:
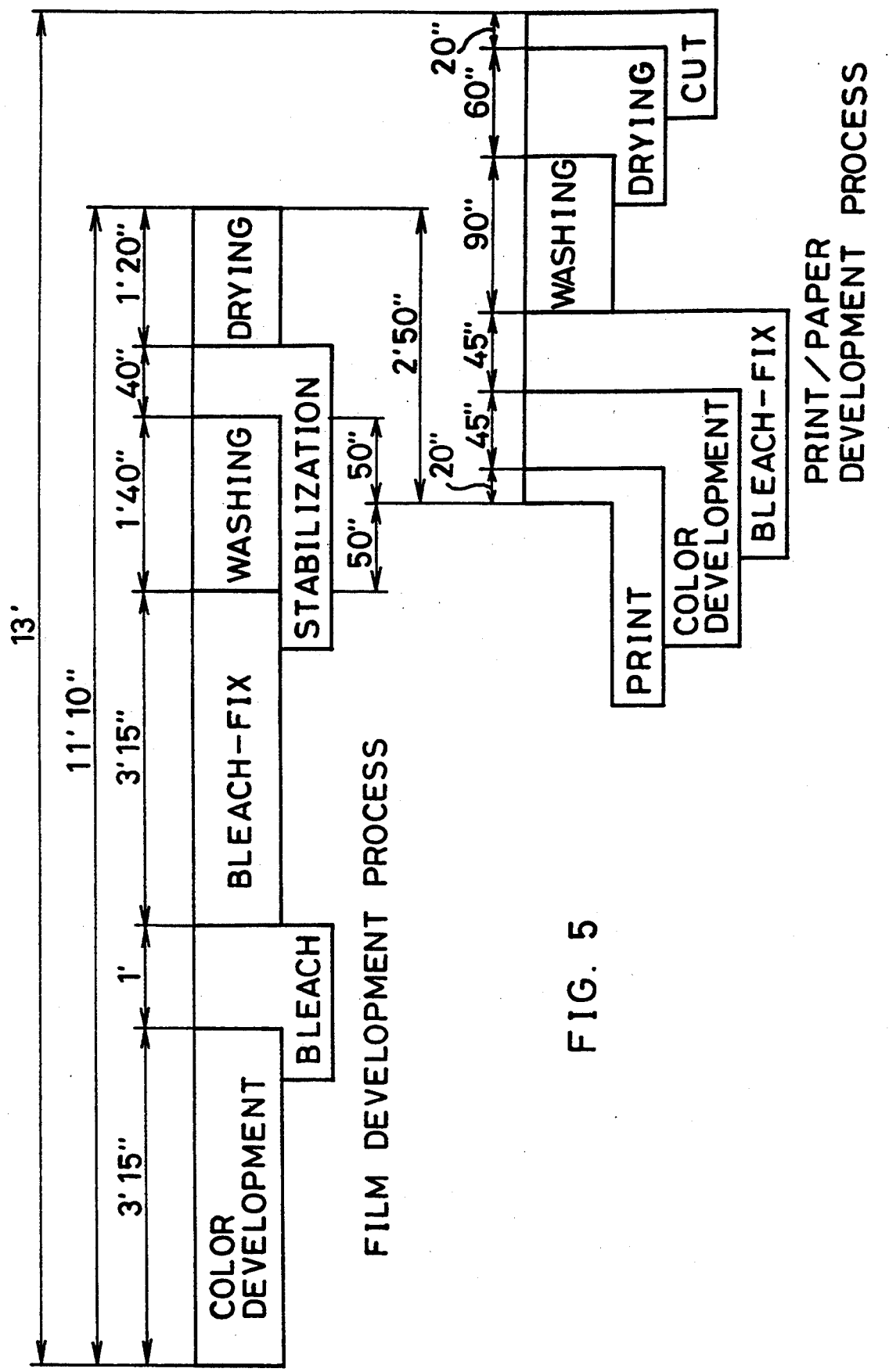
FIG. 5 is a diagram illustrating the various times required for processes during a DP cycle.

FIG. 5 illustrates an example of the timing of a DP cycle of this embodiment. In this embodiment, as described above, an image on a frame of the negative film 1 to be printed is scanned and picked up synchronously with the film advance during the washing or rinsing process of the photographic process. Immediately thereafter, the picked-up image data is used for the digital printing. Therefore, the remaining washing process of 50 seconds, stabilizing process of 40 seconds, and drying process of 1 minute and 20 seconds can be executed in parallel with the print/paper photographic process. It is therefore possible to reduce the process time of each order by the amount corresponding to the parallel processing time (in this embodiment, 2 minutes and 50 seconds). In this way, the total process time from receiving a DP order to delivering finished photoprints, can be shortened. At a mini-lab, an urgent DP order can be handled in a shorter time, thus reducing a customer's waiting time.

Figure 6:
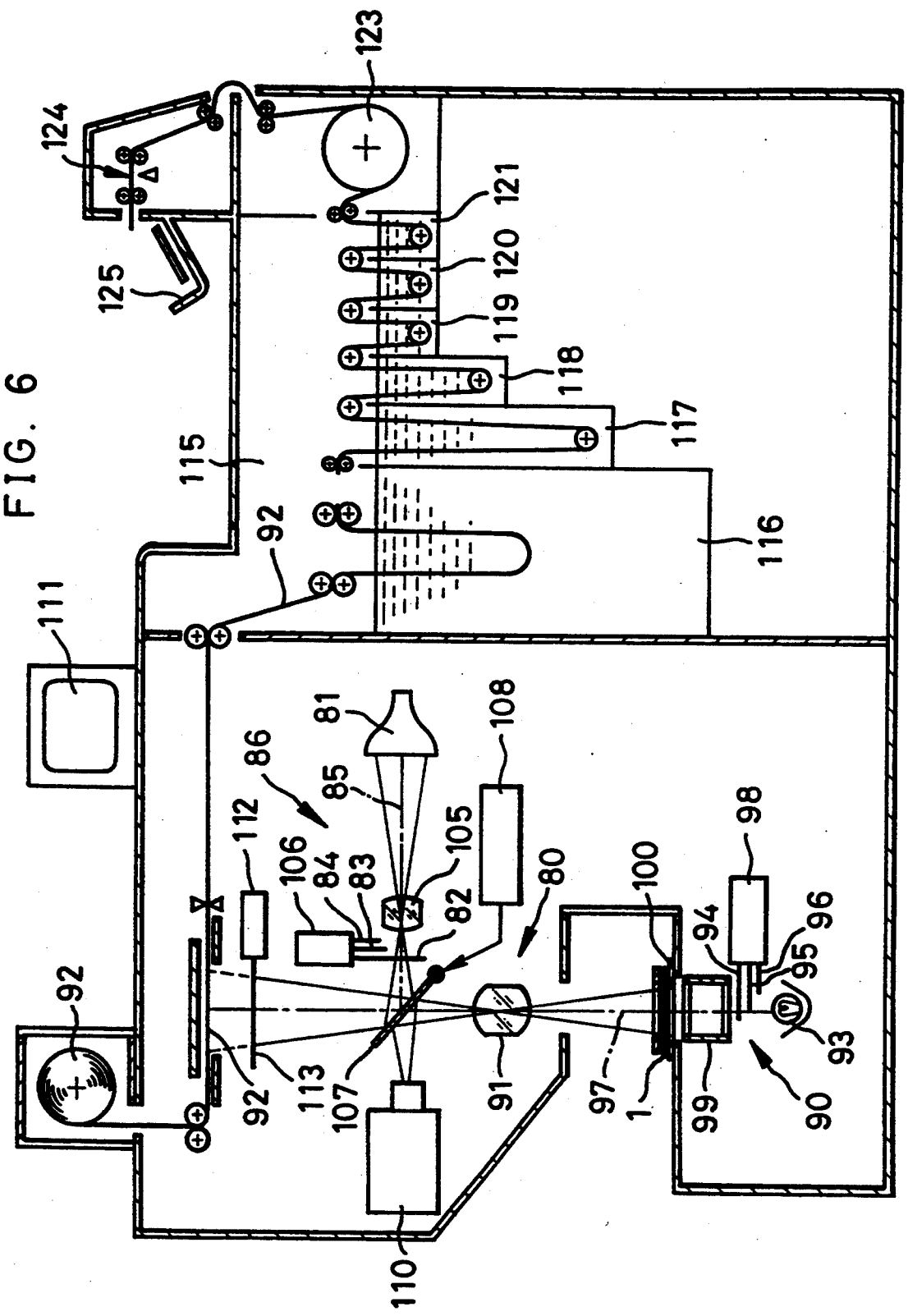
FIG. 6 is a schematic diagram showing a second embodiment of the printer/processor.
Figure 7:
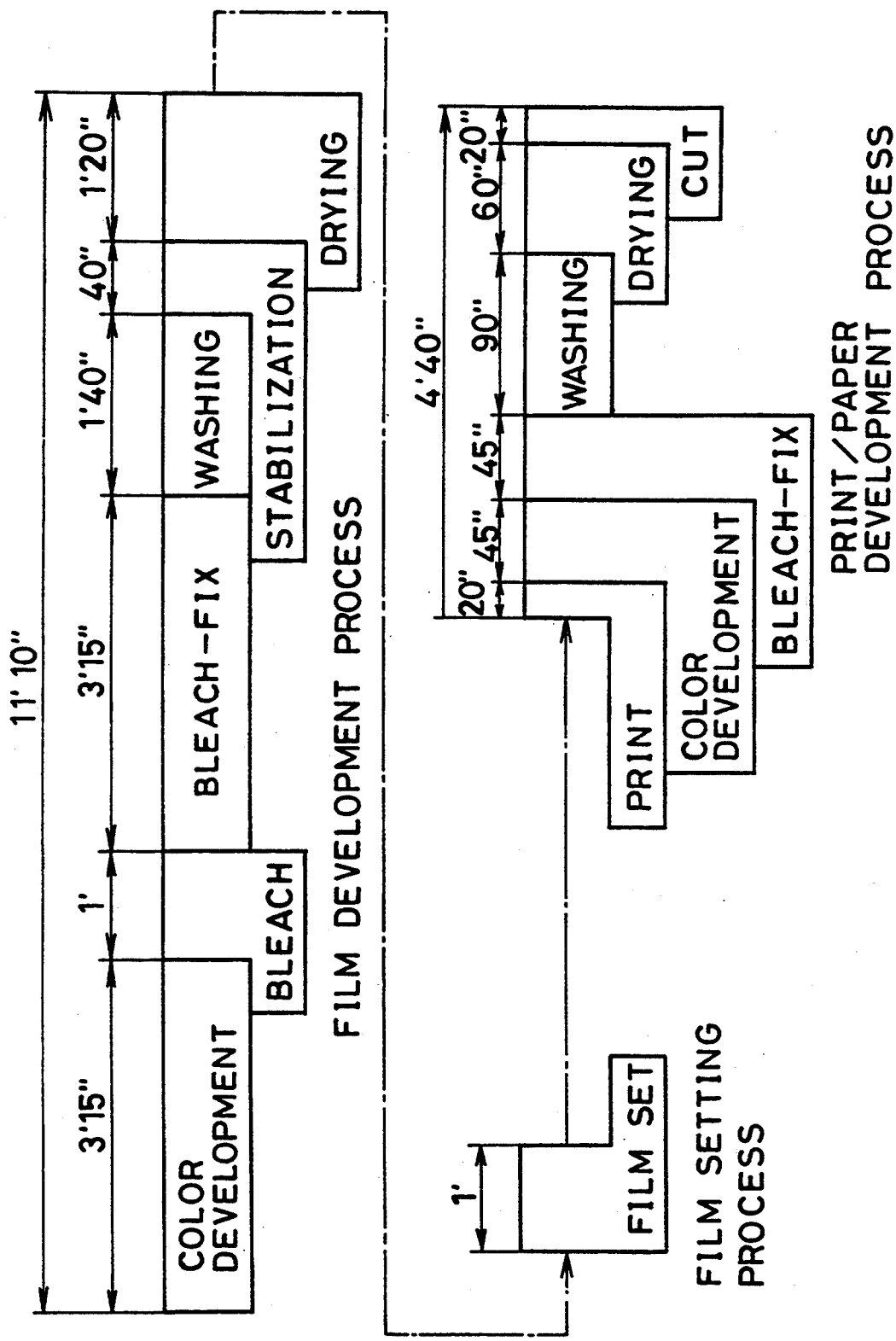
FIG. 7 is a diagram illustrating the various times required for processes of a conventional photograph printing system.
Figure 8:
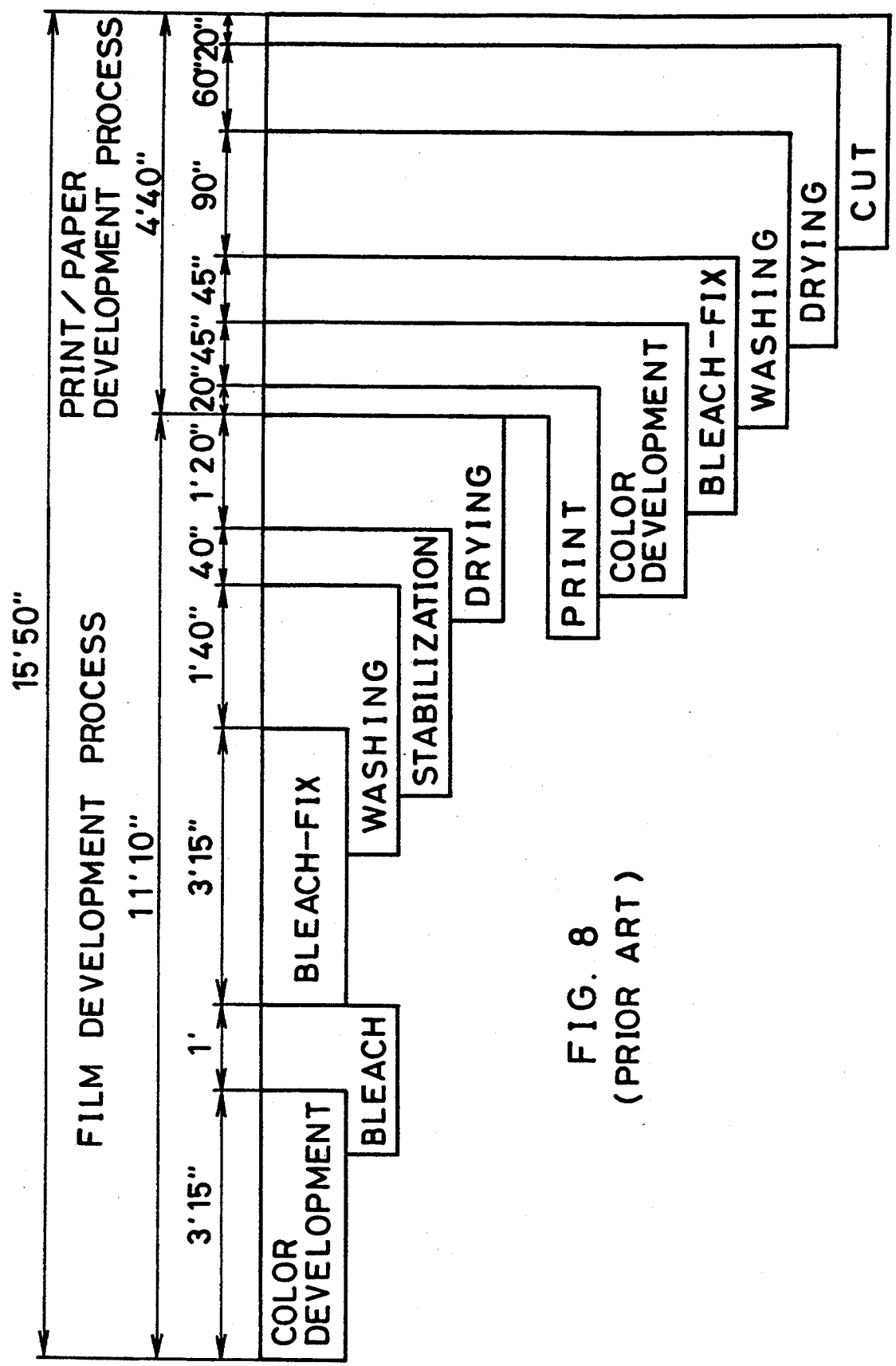
FIG. 8 is a diagram illustrating the various times required for processes of a conventional photograph printing system with a film processor and printer/processor coupled together.

Instead of the above-described printer/processor, another type of printer/processor can be used. This type of printer/processor can selectively use a direct printing exposure method using a developed negative film as in the conventional case, and a printing exposure method using image data of a negative film supplied from the film processor 1. As shown in FIG. 6, this printer/processor has a first printing system 80 using a developed negative film 1, and a second printing system 86 whereby three color image data supplied from the film processor is displayed on a monochrome CRT 81 to perform three color frame sequential exposure while respectively inserting three color filters 82 to 84 into a print optical path 85.

In the first printing system 80, a light source unit 90 applies light to a frame of a negative film to be printed, and focuses the light via a print lens 91 onto a color paper 92, to thereby print the image frame onto the paper 92. The light source unit 90 has a light source 93, a color filter driving unit 98 for inserting three color filters 94 to 96, such as cyan, magenta and yellow, into a print optical path 97 in order to control the light quantity of the light source 93 corresponding to each color, and a mixing box 99 for uniformly diffusing a printing light having controlled intensity and color balance. The negative film 1 is set on a film carrier 100 sets the frame to be printed at a printing position.

The second printing system 86 has a monochrome CRT 81, a printing lens 105 for focussing an image displayed on CRT 81 onto a color paper 92, and a filter setting unit 106 for the three color frame sequential exposure of the image displayed on CRT 81 onto the color paper 92. A mirror 107 is mounted so as to be movable in and out of the print optical path 97 so as to focus an image to the color paper 92, by selecting one of the first and second printing systems 80 and 86. A selecting unit 108 operates to set the mirror 107 either to a retracted position from the print optical path 97 or to a position where the mirror is inserted into the print optical path 97 at an inclined angle of 45 degrees. Instead of the mirror 107 and selecting unit 108, a half mirror or half prism may be used. TV camera 110 is used to display the image on the negative film 1 on a monitor CRT 111. Reference numeral 112 represents a shutter driver for opening and closing a shutter 113.

A printed color paper 92 is transported to a paper processor unit 115 having a paper reservoir 116 for reserving a loop of the color paper 92 so as to absorb a difference between the printing speed and paper developing speed. The reserved color paper 92 of a predetermined length is thereafter developed at processing vessels 117 to 121, dried by a dryer drum 123, cut into each frame by a cutter 124, and ejected out onto a print tray. The printer unit having the first and second printing systems 80 and 86 can select one of them in accordance with a DP order by a customer, satisfying a particular customer need. This printer unit may be used in different modes of operation. Namely, an optional frame image of a negative film under the photographic process is first printed using the second printing system 86, and thereafter based upon the result of this finished print, the final printing is executed using the first printing system 80. Furthermore, a layout process is performed using the second printing system 86 to make an index print, and, based upon the result of this finished index print, the final printing is executed using the first printing system 80.

In the above embodiment, the image pickup unit 6 is provided between the super rinsing vessels 15 and 16 for washing the negative film 1 to obtain image data of a negative film 1. However, the image pickup unit 5 may be mounted at the stabilizing vessel 17 or another vessel, or between the stabilizing vessel 17 and drying vessel 18. Also, the image processing unit 7 may be a discrete apparatus separated from the printer/processor 6.

Furthermore, a reader for reading a DX code or frame number bar code of a negative film 1 may be added to the image pickup unit 5 and the image pickup unit 5 may be structured to read these codes. The discrete film processor 4 and printer/processor 6 in the above embodiment may also be formed integrally. Finally, timing and control of the various elements of the invention can be accomplished through a preprogrammed controller such as a microprocessor based device, or the like.

It is apparent that various modifications can be made to the embodiments described above without departing from the scope of the invention as defined by the appended claims.

What is claimed is:

1. A photograph printing system for making a hard copy while simultaneously executing photographic processing of an exposed film, comprising:
  a film processor having an image pickup unit disposed therein so as to obtain image data, which represents an image formed on said film, during the time duration between a development process and drying process of said photographic processing;
  an image processing unit for processing said image data; and
  a printer for reproducing said image on a recording material in accordance with said processed image data from said image processing unit, said image processing unit being configured to execute a correction calculation for the film type, a correction calculation for each original frame, and the correction for the characteristics of said printer.

2. A photograph printing system according to claim 1, wherein said film is a negative film, and said recording material is a photographic color paper.

3. A photograph printing system according to claim 2, wherein said image processing unit is mounted integrally with said printer.

4. A photograph printing system according to claim 2, wherein said printer includes a paper processor for photographically processing said color paper.

5. A photograph printing system according to claim 4, wherein said image pickup unit is an image line sensor configured so as to scan said film synchronously with transportation of said film through said film processor.

6. A photograph printing system according to claim 5, wherein said image line sensor scan is positioned so as to scan said film while said film is immersed within a photographic processing solution.

7. A photograph printing system according to claim 6, wherein said photographic processing solution is a rinsing solution.

8. A photograph printing system according to claim 9, wherein said rinsing solution is contained in at least two processing vessels which are interconnected by a passage at upper portions thereof, said image line sensor being disposed proximate said passage so that said film is scanned by said image line sensor as said film passes through said passage.

9. A photograph printing system according to claim 8, wherein said passage is a rectangular tube, upper and lower transparent plates being mounted on upper and lower walls of said tube respectively, a light source being mounted above said upper transparent plate, and a lens and said image line sensor being mounted under said lower transparent plate.

10. A photograph printing system according to claim 9, wherein said printer includes a monochrome CRT for sequentially displaying images having image intensities, corresponding to red, green and blue components of an image to be printed, and red, green, and blue filters being selectively disposed in front of said monochrome CRT in correspondence with color images to be recorded based upon said image intensifies.

11. A photograph printing system according to claim 10, wherein said printer further includes a color monitor coupled to said image processing unit so as to display said color image to be printed.

* * * * *